US012602866B2

(12) United States Patent
Ramani et al.

(10) Patent No.: US 12,602,866 B2
(45) Date of Patent: Apr. 14, 2026

(54) DIGITAL TWIN AUTHORING AND EDITING ENVIRONMENT FOR CREATION OF AR/VR AND VIDEO INSTRUCTIONS FROM A SINGLE DEMONSTRATION

(71) Applicant: Purdue Research Foundation, West Lafayette, IN (US)

(72) Inventors: Karthik Ramani, West Lafayette, IN (US); Subramaniam Chidambaram, West Lafayette, IN (US); Sai Swarup Reddy, Sunnyvale, CA (US)

(73) Assignee: Purdue Research Foundation, West Lafayette, IN (US)

( * ) Notice: Subject to any disclaimer, the term of this patent is extended or adjusted under 35 U.S.C. 154(b) by 301 days.

(21) Appl. No.: 18/480,173

(22) Filed: Oct. 3, 2023

(65) Prior Publication Data

US 2024/0112399 A1     Apr. 4, 2024

Related U.S. Application Data

(60) Provisional application No. 63/384,868, filed on Nov. 23, 2022, provisional application No. 63/378,101, filed on Oct. 3, 2022.

(51) Int. Cl.
*G06T 17/00* (2006.01)
*G06F 3/01* (2006.01)
(Continued)

(52) U.S. Cl.
CPC ............. *G06T 17/00* (2013.01); *G06F 3/014* (2013.01); *G06T 7/70* (2017.01); *G06T 13/40* (2013.01); *G06V 40/11* (2022.01); *G06V 40/28* (2022.01)

(58) Field of Classification Search
CPC ........... G06T 17/00; G06T 7/70; G06T 13/40; G06T 2207/30196; G06T 7/73;
(Continued)

(56) References Cited

U.S. PATENT DOCUMENTS

2016/0361649 A1* 12/2016 Hayashi .............. A63F 13/5255
2020/0092536 A1* 3/2020 Watson .................. H04N 21/00
(Continued)

OTHER PUBLICATIONS

M. Whitlock, G. Fitzmaurice, T. Grossman, and J. Matejka. Authar: Concurrent authoring of tutorials for ar assembly guidance. In Graphics Interface, pp. 431-439. CHCCS/SCDHM, University of Toronto, Ontario, Canada, 2020.
(Continued)

*Primary Examiner* — Jitesh Patel
(74) *Attorney, Agent, or Firm* — Maginot, Moore & Beck LLP

(57) ABSTRACT

A system and method for multi-media instruction authoring is disclosed. The multi-media instruction authoring system and method provide a unified and efficient system that supports the simultaneous creation of instructional media in AR, VR, and video-based media formats by subject matter experts. The multi-media instruction authoring system and method require only a single demonstration of the task by the subject matter expert and does not require any technical expertise of the subject matter expert. The multi-media instruction authoring system and method incorporate a 3D editing interface for free hand, in-headset interaction to create 2D videos from 3D recordings, by exploring novel virtual camera interactions.

20 Claims, 15 Drawing Sheets

(51) Int. Cl.
       *G06T 7/70*        (2017.01)
       *G06T 13/40*       (2011.01)
       *G06V 40/10*       (2022.01)
       *G06V 40/20*       (2022.01)

(58) Field of Classification Search
       CPC .......... G06F 3/014; G06F 3/011; G06F 3/017;
                        G06V 40/11; G06V 40/28; G09B 5/06;
                                        G09B 19/003; H04N 23/611
       See application file for complete search history.

(56)                References Cited

U.S. PATENT DOCUMENTS

2020/0168119  A1*   5/2020   Ramani ................. G06T 19/006
2021/0134065  A1*   5/2021   Ramani ................. G06F 3/0346
2021/0252699  A1*   8/2021   Ramani ................. B25J 9/1671

OTHER PUBLICATIONS

L. Wright and S. Davidson. How to tell the difference between a model and a digital twin. Advanced Modeling and Simulation in Engineering Sciences, 7(1):1-13, 2020.
M. Yamaguchi, S. Mori, P. Mohr, M. Tatzgern, A. Stanescu, H. Saito, and D. Kalkofen. Video-annotated augmented reality assembly tutorials. In Proceedings of the 33rd Annual ACM Symposium on User Interface Software and Technology, pp. 1010-1022. Association for Computing Machinery, New York, NY, USA, 2020.
U. Yang and G. J. Kim. Implementation and evaluation of "just follow me": An immersive, vr-based, motion-training system. Presence, 11(3):304-323, 2002. doi: 10.1162/105474602317473240.
YouTube. Youtube, Apr. 2021.
J. Zillner, E. Mendez, and D. Wagner. Augmented reality remote collaboration with dense reconstruction. In 2018 IEEE International Symposium on Mixed and Augmented Reality Adjunct (ISMAR-Adjunct), pp. 38-39, 2018. doi: 10.1109/ISMAR-Adjunct.2018.00028.
F. Anderson, T. Grossman, J. Matejka, and G. Fitzmaurice. Youmove: enhancing movement training with an augmented reality mirror. In Proceedings of the 26th annual ACM symposium on User interface software and technology, pp. 311-320. Association for Computing Machinery, New York, NY, USA, 2013.
Antilatency. Antilatency, Apr. 2021.
D. Aouam, S. Benbelkacem, N. Zenati, S. Zakaria, and Z. Meftah. Voice-based augmented reality interactive system for car's components assembly. In 2018 3rd International Conference on Pattern Analysis and Intelligent Systems (PAIS), pp. 1-5, 2018. doi: 10.1109/PAIS.2018.8598516.
A. Bangor, P. Kortum, and J. Miller. Determining what individual sus scores mean: Adding an adjective rating scale. Journal of usability studies, 4(3):114-123, 2009.
Blackmagicdesign. Davinci resolve 17, Nov. 2020.
J. Brooke et al. Sus-a quick and dirty usability scale. Usability evaluation in industry, 189(194):4-7, 1996.
Y. Cao, X. Qian, T. Wang, R. Lee, K. Huo, and K. Ramani. An exploratory study of augmented reality presence for tutoring machine tasks. In Proceedings of the 2020 CHI Conference on Human Factors in Computing Systems, pp. 1-13. Association for Computing Machinery, New York, NY, USA, 2020.
S. Chidambaram, H. Huang, F. He, X. Qian, A. M. Villanueva, T. S. Redick, W. Stuerzlinger, and K. Ramani. ProcessAR: An Augmented Reality-Based Tool to Create in-Situ Procedural 2D/3D AR Instructions, p. 234-249. Association for Computing Machinery, New York, NY, USA, 2021.
L. L. Cone. Skycam: an aerial robotic camera system. Byte Magazine, 10:122, 1985.
A. R. Fender and C. Holz. Causality-preserving asynchronous reality. In CHI Conference on Human Factors in Computing Systems, CHI '22. Association for Computing Machinery, New York, NY, USA, 2022. doi: 10.1145/3491102.3501836.

M. Funk, M. Kritzler, and F. Michahelles. Holocollab: a shared virtual platform for physical assembly training using spatially-aware headmounted displays. In Proceedings of the Seventh International Conference on the Internet of Things, pp. 1-7. Association for Computing Machinery, New York, NY, USA, 2017.
Q. Galvane, I.-S. Lin, F. Argelaguet, T.-Y. Li, and M. Christie. Vr as a content creation tool for movie previsualisation. In 2019 IEEE Conference on Virtual Reality and 3D User Interfaces (VR), pp. 303-311, 2019. doi: 10.1109/VR.2019.8798181.
R. Griffin, T. Langlotz, and S. Zollmann. 6dive: 6 degrees-of-freedom immersive video editor. Frontiers in Virtual Reality, 2:75, 2021.
T. Ha, W. Woo, Y. Lee, J. Lee, J. Ryu, H. Choi, and K. Lee. Artalet: tangible user interface based immersive augmented reality authoring tool for digilog book. In 2010 International Symposium on Ubiquitous Virtual Reality, pp. 40-43. IEEE Computer Society, Los Alamitos, CA, USA, 2010.
S. G. Hart and L. E. Staveland. Development of nasa-tlx (task load index): Results of empirical and theoretical research. In Advances in psychology, vol. 52, pp. 139-183. Elsevier, USA, 1988.
S. J. Henderson and S. K. Feiner. Augmented reality in the psychomotor phase of a procedural task. In 2011 10th IEEE International Symposium on Mixed and Augmented Reality, pp. 191-200. IEEE, IEEE Computer Society, Los Alamitos, CA, USA, 2011.
K. Huang, J. Li, M. Sousa, and T. Grossman. Immersivepov: Filming how-to videos with a head-mounted 360° action camera. In CHI Conference on Human Factors in Computing Systems, CHI '22. Association for Computing Machinery, New York, NY, USA, 2022. doi: 10.1145/3491102.3517468.
A. Hughes. Forging the digital twin in discrete manufacturing: A vision for unity in the virtual and real worlds, Sep. 2018.
T. Imai, A. E. Johnson, J. Leigh, D. E. Pape, and T. A. DeFanti. The virtual mail system. In Proceedings of Virtual Reality, pp. 78-78. IEEE Computer Society, Los Alamitos, CA, USA, 1999.
Instructables. instructables, Apr. 2021.
A. Ipsita, L. Erickson, Y. Dong, J. Huang, A. K. Bushinski, S. Saradhi, A. M. Villanueva, K. A. Peppler, T. S. Redick, and K. Ramani. Towards modeling of virtual reality welding simulators to promote accessible and scalable training. In CHI Conference on Human Factors in Computing Systems, CHI '22. Association for Computing Machinery, New York, NY, USA, 2022. doi: 10.1145/3491102.3517696.
S. Kim, H. gun Chi, and K. Ramani. Object synthesis by learning part geometry with surface and volumetric representations. Computer-Aided Design, 130:102932, 2021. doi: 10.1016/j.cad.2020.102932.
K. Lilija, H. Pohl, and K. Hornbæk. Who put that there? temporal navigation of spatial recordings by direct manipulation. In Proceedings of the 2020 CHI Conference on Human Factors in Computing Systems, pp. 1-11. Association for Computing Machinery, New York, NY, USA, 2020.
S.-C. Lim, H.-K. Lee, and J. Park. Role of combined tactile and kinesthetic feedback in minimally invasive surgery. The International Journal of Medical Robotics and Computer Assisted Surgery, 11(3):360-374, 2015.
M. R. Marner, A. Irlitti, and B. H. Thomas. Improving procedural task performance with augmented reality annotations. In 2013 IEEE International Symposium on Mixed and Augmented Reality (ISMAR), pp. 39-48. IEEE, IEEE Computer Society, Los Alamitos, CA, USA, 2013.
A. Marwanto, Y. Wibowo, R. Djatmiko, and R. Wijaya. Kinesthetic intelligence in welding practice lectures. In Journal of Physics: Conference Series, No. 1, p. 012022. IOP Publishing, IOP Publishing, Orlando, Florida, 2020.
P. Mohr, D. Mandl, M. Tatzgern, E. Veas, D. Schmalstieg, and D. Kalkofen. Retargeting video tutorials showing tools with surface contact to augmented reality. In Proceedings of the 2017 CHI Conference on Human Factors in Computing Systems, pp. 6547-6558. Association for Computing Machinery, New York, NY, USA, 2017.
M. Morozov, A. Gerasimov, and M. Fominykh. vacademia-educational virtual world with 3d recording. In 2012 International Conference on Cyberworlds, pp. 199-206. IEEE Computer Society, Los Alamitos, CA, USA, 2012.

(56) References Cited

OTHER PUBLICATIONS

M. Nebeling, S. Rajaram, L. Wu, Y. Cheng, and J. Herskovitz. Xrstudio: A virtual production and live streaming system for immersive instructional experiences. In Proceedings of the 2021 CHI Conference on Human Factors in Computing Systems, CHI '21. Association for Computing Machinery, New York, NY, USA, 2021. doi: 10.1145/3411764.3445323.

C. Nguyen, S. DiVerdi, A. Hertzmann, and F. Liu. Vremiere: Inheadset virtual reality video editing. In Proceedings of the 2017 CHI Conference on Human Factors in Computing Systems, p. 5428-5438. Association for Computing Machinery, New York, NY, USA, 2017.

Oculus. Oculus quest 2, 2020. Retrieved Apr. 4, 2021, from https://www.oculus.com/quest-2/.

O. Oda, C. Elvezio, M. Sukan, S. Feiner, and B. Tversky. Virtual replicas for remote assistance in virtual and augmented reality. In Proceedings of the 28th Annual ACM Symposium on User Interface Software & Technology, pp. 405-415. Association for Computing Machinery, New York, NY, USA, 2015.

S. Ong and Z. Wang. Augmented assembly technologies based on 3d bare-hand interaction. CIRP annals, 60(1):1-4, 2011.

OptiTrack. Optitrack, Apr. 2021.

M. Perry, O. Juhlin, M. Esbjornsson, and A. Engstrom. Lean Collaboration through Video Gestures: Co-Ordinating the Production of Live Televised Sport, p. 2279-2288. Association for Computing Machinery, New York, NY, USA, 2009.

PTC. Vuforia expert capture, 2019. Retrieved May 5, 2020, from https://www.ptc.com/en/products/augmented-reality/vuforia-expert-capture.

PTC. Vuforia chalk: Remote assistance powered by augmented reality, Dec. 2020.

R. Radkowski and C. Stritzke. Interactive hand gesture-based assembly for augmented reality applications. In Proceedings of the 2012 International Conference on Advances in Computer-Human Interactions, pp. 303-308. Citeseer, Valencia, Spain, 2012.

M. Sayed, R. Cinca, E. Costanza, and G. Brostow. Lookout! interactive camera gimbal controller for filming long takes, 2020.

M. Scheff-King. Download, edit and print your own parts from mcmaster-carr, Apr. 2014.

M. Sheets-Johnstone. Kinesthetic memory. Theoria et historia scientiarum, 7(1):69-92, 2003.

Skillshare. Skillshare, Apr. 2021.

Stereolabs. Zed mini, Apr. 2021.

B. Thoravi Kumaravel, F. Anderson, G. Fitzmaurice, B. Hartmann, and T. Grossman. Loki: Facilitating remote instruction of physical tasks using bi-directional mixed-reality telepresence. In Proceedings of the 32nd Annual ACM Symposium on User Interface Software and Technology, pp. 161-174. Association for Computing Machinery, New York, NY, USA, 2019.

Traceparts. Traceparts, 1990. Retrieved Mar. 8, 2022, from https://www.traceparts.com/en.

Tvori. tvori, Feb. 2022.

A. van Dam. Post-wimp user interfaces. Commun. ACM, 40(2):63-67, Feb. 1997. doi: 10.1145/253671.253708.

Vreal. vreal, Mar. 2018.

C. Y. Wang, M. Sakashita, U. Ehsan, J. Li, and A. S. Won. Again, together: Socially reliving virtual reality experiences when separated. In Proceedings of the 2020 CHI Conference on Human Factors in Computing Systems, pp. 1-12. Association for Computing Machinery, New York, NY, USA, 2020.

T. Wang, X. Qian, F. He, X. Hu, Y. Cao, and K. Ramani. GesturAR: An Authoring System for Creating Freehand Interactive Augmented Reality Applications, p. 552-567. Association for Computing Machinery, New York, NY, USA, 2021.

* cited by examiner

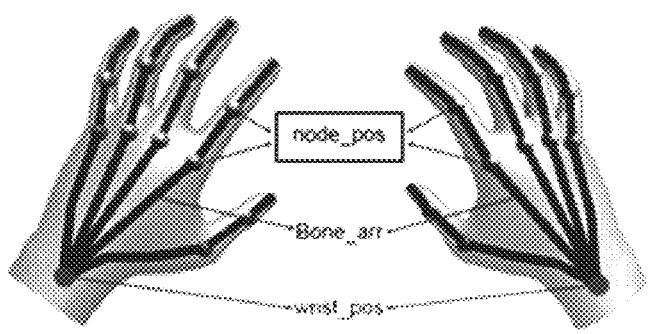

FIG. 6B

```
Algorithm 1: Create Gesture Algorithm
   Inputs : vec3 wrist_pos = transform.position()
              vector <vec3> node_pos = transform.position() // For each joint in the hand vector <vec3> Bone_arr // Initialize
     foreach n_pos in node_pos do
     |   Bone_arr.Push(node_pos - wrist_pos) //Vector of each node position to wrist position
     end
     return Bone_arr
```

```
Algorithm 2: Detecting Gesture Algorithm
   Inputs : vec3 wrist_pos = transform.position()
              vector <vec3> current_node_pos
              vector <vec3> Bone_arr // From create gesture algorithm
              float threshold = 0.06 // Tuned for best precision, via trial & error
              int final_gesture = -1 // Initialize int no_gesture // Number of different gestures
     int no_arr = 20 // Initialize from oculus skeletal hand tracking
     for gesture = 0,1,2...no_gesture do
     |   int joint = 0
     |     while joint < no_arr do
     |     |   current_pos = current_node_pos[joint] - wrist_pos
     |     |     if (Bone_arr[joint]-current_pos).magnitude > threshold then
     |     |     |   break
     |     |     end
     |     end
     |     if joint == no_arr then
     |     |   final_gesture = gesture
     |     |     break
     |     end
     end
     return final_gesture
```

FIG. 6C

```
Algorithm 3: Auto-Follow of Virtual Camera Algorithm

Inputs: Left_pos = Left hand transform.position()
        Right_pos = Right hand transform.position()
        no_frame[] = N //Number of frame for tracking for frame = 0,1,2...N do
    vec3 mid_point = midpoint(Left_pos, Right_pos)
    vec3 left_centered = vec3(Left_pos.x, mid_point.y, Left_pos.z)
    vec3 right_centered = vec3(Right_pos.x, mid_point.y, Right_pos.z)
    vec3 diff = right_centered - left_centered
    vec3 pt_1 = left_centered - 0.5 // allow upto 0.5 units to be covered beside left hand
    vec3 pt_2 = right_centered + 0.5 // allow upto 0.5 units to be covered beside right hand
    Quaternion rotation = Camera_Orientation(-diff, vec3(0,1,0)) // utilize the LookRotation() in Unity3D
    // sets the correct camera orientation with respect to the given hand position
    rotation = rotation.rotate(0,π/2,0).rotate(5*π/36,0,0)
    distance_back = ((pt_2-pt_1) * magnitude)/(2*arctan(π/4))
    vec3 position = midpoint - rotation * vec3(0,0,1) * min(distance_back, 0.5)
    return position, rotation
end
```

FIG. 11

DIGITAL TWIN AUTHORING AND EDITING ENVIRONMENT FOR CREATION OF AR/VR AND VIDEO INSTRUCTIONS FROM A SINGLE DEMONSTRATION

This application claims the benefit of priority of U.S. provisional application Ser. No. 63/378,101, filed on Oct. 3, 2022 and U.S. provisional application Ser. No. 63/384,868, filed on Nov. 23, 2022, the disclosures of which are herein incorporated by reference in their entireties.

GOVERNMENT LICENSE RIGHTS

This invention was made with government support under contract number DUE1839971 awarded by the National Science Foundation. The government has certain rights in the invention.

FIELD

The device and method disclosed in this document relates to augmented and virtual reality and, more particularly, to an authoring and editing environment for creation of augmented and virtual reality and video instructions from a single demonstration.

BACKGROUND

Unless otherwise indicated herein, the materials described in this section are not admitted to be the prior art by inclusion in this section.

Kinesthetic or hands-on learning can be defined as the ability to process information through touch and movement. Kinesthetic learning is an integral part of skill acquisition for spatial tasks such as welding, machining, assembly, home repair, surgery, and several others. Currently, one-on-one instruction, video-based media, and paper-based methods are widely used modes of instructional transfer for kinesthetic skill acquisition. In the past decade, platforms such as SkillShare, Instructables, YouTube, and others have seen an exponential growth in instructional content. All of these platforms are video-based and creators are quite prolific with this "default" authoring medium. However, commercial interest in immersive media, such as augmented reality (AR) and virtual reality (VR), is on the rise due to advances in low-cost untethered headsets, such as the Oculus Quest 2. Moreover, there is growing evidence that AR and VR instructional media can improve task completion rate with fewer errors and provide better usability.

Having multiple options for media consumption allows people with different hardware platforms and resources to participate in learning activities. However, authoring content for these different media also requires instructors to possess multiple skill-sets. Particularly, alongside their subject expertise, Subject Matter Experts (SMEs) are required to know 3D modeling, video editing, AR/VR programming, and instructional design to develop content for authoring all these media. An alternative would be for SMEs to work with different professionals to develop content leading to increased resource requirements, in terms of cost and effort. There is also the added constraint of time and the need for multiple demonstrations of the same task. Particularly, the SME has to demonstrate the same task multiple times to support content creation for different media, making the task inefficient.

Accordingly, there is need for immersive media authoring environments that can produce immersive media content, while still supporting widely-used "default" authoring mediums, such as video. Moreover, there is a need for immersive media authoring environments that enable non media/programming experts to participate in the creation process. An easy-to-use immersive media authoring environment for AR and VR instructional content would open a door towards wider expansion and adoption of these new instructional technologies.

SUMMARY

A method for generating multi-media instructional content is discloses. The method comprises recording, with at least one sensor, a demonstration by a user of a task within a real-world environment. The method further comprises determining, with a processor, a first sequence of pose data for a virtual avatar based on the recorded demonstration. The method further comprises generating, with the processor, based on the first sequence of pose data, at least one of (i) augmented reality content that provides instructions to perform the task, (ii) virtual reality content that provides instructions to perform the task, and (iii) a two-dimensional video that provides instructions to perform the task.

BRIEF DESCRIPTION OF THE DRAWINGS

The foregoing aspects and other features of the system and method are explained in the following description, taken in connection with the accompanying drawings.

FIG. 6B shows the hand pose information that is recorded and tracked for hand gesture creation and detection.

FIG. 6C shows pseudocode for a custom hand gesture creation algorithm and a hand gesture detection algorithm.

FIG. 11 shows an algorithm used by the automated hand tracking camera.

DETAILED DESCRIPTION

Figure 1:
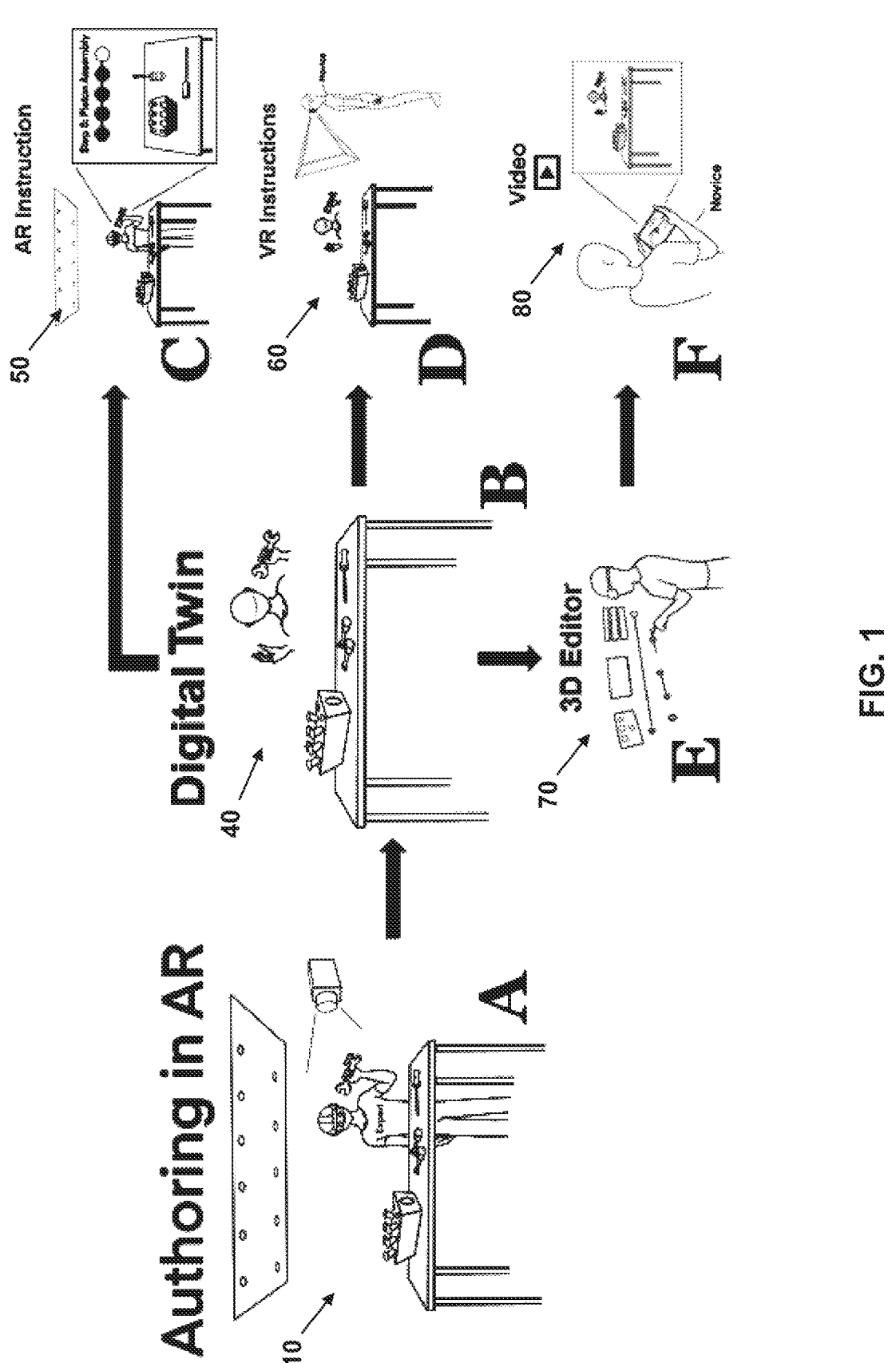
FIG. 1 shows an exemplary workflow of a multi-media instruction authoring system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

With reference to FIGS. 1-4, exemplary embodiments of a multi-media instruction authoring system 10 are described. The multi-media instruction authoring system 10 provides a unified and efficient system that advantageously supports the simultaneous creation of instructional media for a task in AR, VR, and video-based media formats by subject matter experts. The multi-media instruction authoring system 10 advantageously requires only a single demonstration of the task by the subject matter expert and does not require any technical expertise on the part of the subject matter expert. The multi-media instruction authoring system 10 advantageously incorporates a 3D editing interface in which users can create 2D videos from 3D recordings using simple free hand, in-headset interactions and leveraging novel virtual camera interactions.

With reference in particular to FIG. 1, an exemplary workflow of the multi-media instruction authoring system 10 is illustrated. In illustration (A), a user (e.g., a subject matter expert) demonstrates a task using physical tools and other objects. The multi-media instruction authoring system 10 actively tracks the position and orientation of objects in the scene, as the user demonstrates the task. In addition to object information, the multi-media instruction authoring system 10 also captures the position and orientation of the user's hands, torso, and/or head. In at least one embodiment, the multi-media instruction authoring system 10 captures the user demonstration within the environment using sensors of an AR head-mounted-display (AR-HMD), in combination with external 6-DoF tracking sensors mounted to objects, e.g., tools, that are involved in the task.

In illustration (B), a digital twin recording 40 of the user's demonstration is generated based on the captured information during the demonstration of the task. As used herein, a digital twin recording 40 refers to an executable virtual model of a demonstration of a task. The digital twin recording 40 represents all objects/tools involved in the task with virtual model and represents the user as a virtual avatar. In at least one embodiment, the digital twin recording 40 represents the user as a half-body avatar. However, full-body avatar, non-avatar, or direct video representations are also possible. In any case, the digital twin recording 40 generally takes the form of a sequence of poses of a virtual avatar (e.g., hands, torso, and/or head) and sequences of poses of the virtual models representing objects involved in the task. The digital twin recording 40 (also known as a 3D recording) is a type of virtual volumetric video consisting of a 3D scene with a temporal component.

The digital twin recording 40 enables the multi-media instruction authoring system 10 to easily generate instructional media in AR, VR, and video-based media formats. The immersive nature of both AR and VR allows for the content to be simply replayed from the author's demonstration over the physical world or the virtual world, respectively. In illustration (C), AR instructional content 50 for the task for use in a similar environment can be easily exported based on the digital twin recording 40 for the demonstration. Likewise, in illustration (D), VR instructional content 60 for the task for viewing within an immersive VR environment can also be exported based on the digital twin recording 40 for the demonstration.

In contrast to AR and VR instructional media, creating 2D videos from a virtual 3D recording leverages an easy-to-use editing environment. In illustration (E), the multi-media instruction authoring system 10 provides a video editor 70 that enables a user to create 2D instructional videos from the digital twin recording 40, with the aid of virtual cameras. In illustration (F), the multi-media instruction authoring system 10 exports a 2D instructional video 80 for viewing on a traditional 2D display after the user has performed the editing of the 2D instructional video 80.

Figure 2:
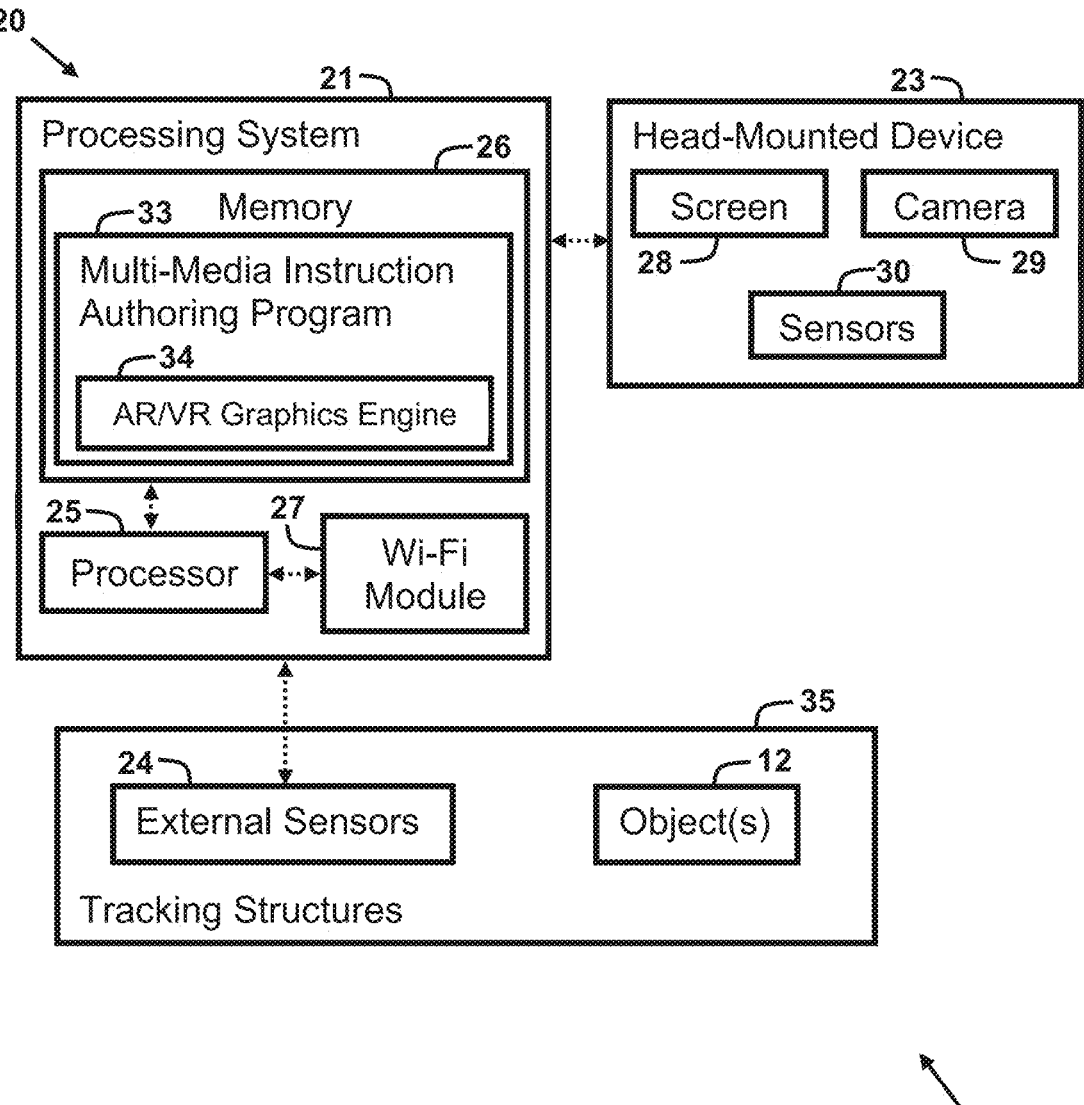
FIG. 2 shows exemplary components of an AR system of the multi-media instruction authoring system.
Figure 3:
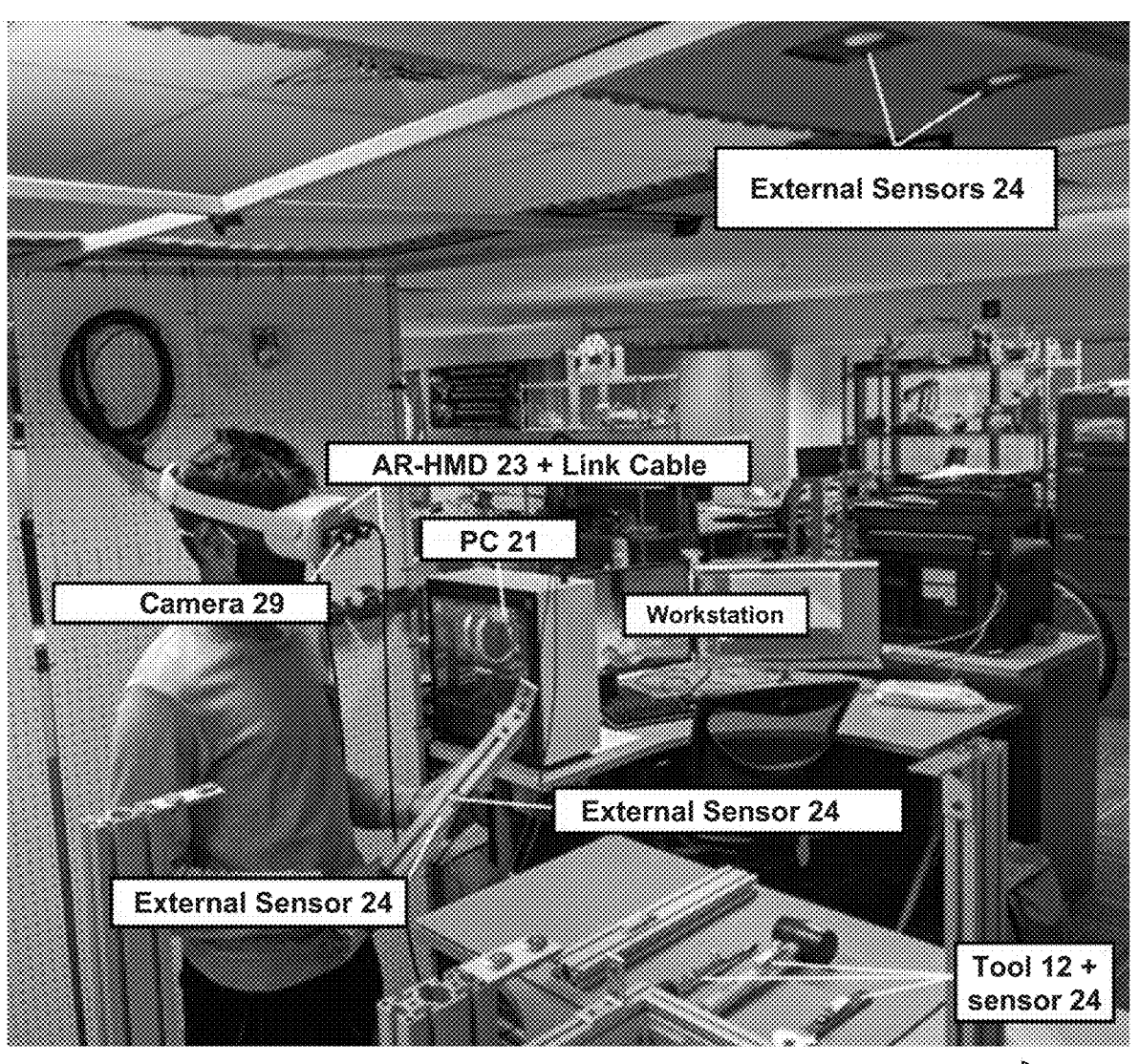
FIG. 3 shows tracking structures of the multi-media instruction authoring system.

FIG. 2 shows exemplary components of an AR system 20 of the multi-media instruction authoring system 10. It should be appreciated that the components of the AR system 20 shown and described are merely exemplary and that the AR system 20 may comprise any alternative configuration. Moreover, in the illustration of FIG. 2, only a single AR system 20 is shown. However, in practice the multi-media instruction authoring system 10 may include one or multiple AR systems 20.

To enable the multi-media instruction authoring, the multi-media instruction authoring system 10 at least includes the AR system 20, at least part of which is worn or held by a user, and one or more objects 12 (e.g., tools and workpieces) in the environment that can be interacted with by the user to demonstrate the task. The AR system 20 preferably includes an AR-HMD 23 having at least a camera and a display screen, but may include any mobile AR device, such as, but not limited to, a smartphone, a tablet computer, a handheld camera, or the like having a display screen and a camera. In one example, the AR-HMD 23 is in the form of an AR or virtual reality headset (e.g., Microsoft's HoloLens, Oculus Rift, or Oculus Quest) or equivalent AR glasses having an integrated or attached front-facing stereo-camera 29 (e.g., ZED Dual 4MP Camera (2560×720p, 60 fps)).

In the illustrated exemplary embodiment, the AR system 20 includes a processing system 21, the AR-HMD 23, and external sensors 24. In some embodiments, the processing system 21 may comprise a discrete computer that is configured to communicate with the AR-HMD 23 and the external sensors 24 via one or more wired or wireless connections. In some embodiments, the processing system 21 takes the form of a backpack computer connected to the AR-HMD 23. However, in alternative embodiments, the processing system 21 is integrated with the AR-HMD 23. Moreover, the processing system 21 may incorporate server-side cloud processing systems.

In some embodiments, the multi-media instruction authoring system 10 incorporates one or more tracking structures 35 that enable to AR system 20 to provide more accurate and lower latency tracking. In one embodiment, with reference to FIG. 3, the tracking structures 35 include a frame structure within which the user performs a demonstration of a task. In the illustrated example, the frame structure is aluminum structure made of 80/20 Quick Frame. At least some of the external sensors 24 may be integrated with the frame structure or integrated with the objects 12 that are interacted with by the user during the demonstration. In one embodiment, for 6-DoF tool/object tracking, the tracking structures 35 incorporate, as the external sensors 24, Antilatency's system providing a defined tracking area (e.g., 10×10×10 ft), with 'Alt Tags' and 'Alt Trackers' tracking modules 24 affixed to the frame structure or to the objects 12. In one embodiment, the sensor data from the external sensors 24 is wirelessly transmitted to the processing system 21 (e.g., a PC) via Antilatency's 'HMD Radio Sockets'. In one embodiment, to minimize unwanted occlusions, the tracking structures 35 incorporate a plurality of external sensors 24, such as active markers, mounted on the ceiling to enable the object-mounted external sensors 24 to determine their positions.

As shown in FIG. 2, the processing system 21 comprises a processor 25 and a memory 26. The memory 26 is configured to store data and program instructions that, when executed by the processor 25, enable the AR system 20 to perform various operations described herein. The memory 26 may be of any type of device capable of storing information accessible by the processor 25, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 25 may include a system with a central processing unit, graphics processing units, multiple processing units, dedicated circuitry for achieving functionality, programmable logic, or other processing systems.

The processing system 21 further comprises one or more transceivers, modems, or other communication devices configured to enable communications with various other devices. Particularly, in the illustrated embodiment, the processing system 21 comprises a Wi-Fi module 27. The Wi-Fi module 27 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. As discussed in further detail below, the processor 25 is configured to operate the Wi-Fi module 27 to send and receive messages, such as control and data messages, to and from the IoT devices via the Wi-Fi network and/or Wi-Fi router. It will be appreciated, however, that other communication technologies, such as Bluetooth, Z-Wave, Zigbee, or any other radio frequency-based communication technology can be used to enable data communications between devices in the system 10.

In the illustrated exemplary embodiment, the AR-HMD 23 comprises a display screen 28 and the camera 29. The camera 29 is configured to capture a plurality of images of the environment 50 as the head mounted AR device 23 is moved through the environment 50 by the user. The camera 29 is configured to generate image frames of the environment 50, each of which comprises a two-dimensional array of pixels. Each pixel has corresponding photometric information (intensity, color, and/or brightness). In some embodiments, the camera 29 is configured to generate RGB-D images in which each pixel has corresponding photometric information and geometric information (depth and/or distance). In such embodiments, the camera 29 may, for example, take the form of two RGB cameras configured to capture stereoscopic images, from which depth and/or distance information can be derived, or an RGB camera with an associated IR camera configured to provide depth and/or distance information.

The display screen 28 may comprise any of various known types of displays, such as LCD or OLED screens. In at least one embodiment, the display screen 28 is a transparent screen, through which a user can view the outside world, on which certain graphical elements are superimposed onto the user's view of the outside world. In the case of a non-transparent display screen 28, the graphical elements may be superimposed on real-time images/video captured by the camera 29. In further embodiments, the display screen 28 may comprise a touch screen configured to receive touch inputs from a user.

In some embodiments, the AR-HMD 23 may further comprise a variety of sensors 30. In some embodiments, the sensors 30 include sensors configured to measure one or more accelerations and/or rotational rates of the AR-HMD 23. In one embodiment, the sensors 30 comprises one or more accelerometers configured to measure linear accelerations of the AR-HMD 23 along one or more axes (e.g., roll, pitch, and yaw axes) and/or one or more gyroscopes configured to measure rotational rates of the AR-HMD 23 along one or more axes (e.g., roll, pitch, and yaw axes). In some embodiments, the sensors 30 include LIDAR or IR cameras. In some embodiments, the sensors 30 may include inside-out motion tracking sensors configured to track human body motion of the user within the environment, in particular positions and movements of the head, arms, and hands of the user.

The AR-HMD 23 may also include a battery or other power source (not shown) configured to power the various components within the AR-HMD 23, which may include the processing system 21, as mentioned above. In one embodiment, the battery of the AR-HMD 23 is a rechargeable battery configured to be charged when the AR-HMD 23 is connected to a battery charger configured for use with the AR-HMD 23.

The program instructions stored on the memory 26 include a multi-media instruction authoring program 33. As discussed in further detail below, the processor 25 is configured to execute the multi-media instruction authoring program 33 to enable authoring instructional media in AR, VR, and video-based media formats. In one embodiment, the multi-media instruction authoring program 33 is implemented with the support of Microsoft Mixed Reality Toolkit (MRTK), Final IK, and mesh effect libraries 2 3 4. In one embodiment, the multi-media instruction authoring program 33 includes an AR/VR graphics engine 34 (e.g., Unity3D engine, Oculus SDK), which provides an intuitive visual interface for the multi-media instruction authoring program 33. Particularly, the processor 25 is configured to execute the AR/VR graphics engine 34 to superimpose on the display screen 28 graphical elements for the purpose of authoring AR interactions. In the case of a non-transparent display screen 28, the graphical elements may be superimposed on real-time images/video captured by the camera 29 (i.e., video passthrough).

Figure 4:
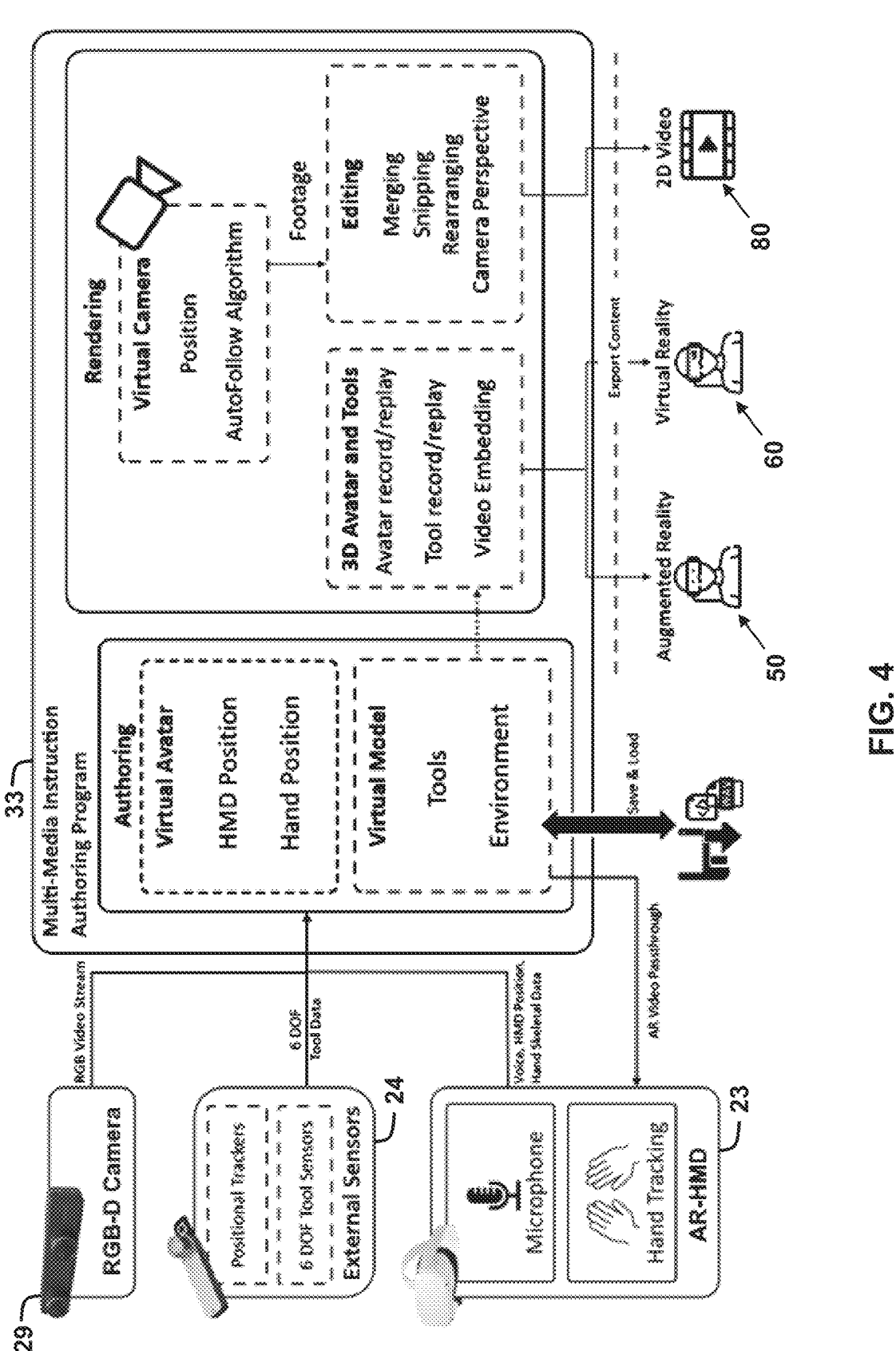
FIG. 4 shows a system architecture and an overview of the data flow from the different hardware used for various system sub-models.

FIG. 4 shows a system architecture and an overview of the data flow from the different hardware used for various system sub-models. The multi-media instruction authoring program 33 receives an RGB video stream from the camera 29. Additionally, the multi-media instruction authoring program 33 receives 6-DoF orientation and position data from the external sensors 24. Finally, the multi-media instruction authoring program 33 receives voice data, HMD orientation and position data, and hand-tracking/skeletal data from the AR-HMD 23. In one embodiment, the Oculus SDK is used for hand tracking and visualization.

All of these data are made available to an authoring function of the multi-media instruction authoring program 33 for the purpose of recording the digital twin recording including a virtual avatar of the user and virtual models of the objects 12 (e.g., tools and/or workpieces) and other structures of the environment. In at least some embodiments, the authoring function of the multi-media instruction authoring program 33 returns AR passthrough video to the AR-HMD 23 with AR graphical user interface elements superimposed therein. The digital twin recording, including the virtual avatar recording and virtual object recordings, is provided from the authoring function to a rendering function of the multi-media instruction authoring program 33.

The rendering function of the multi-media instruction authoring program 33 automatically generates the AR instructional content 50 and the VR instructional content 60 based on the digital twin recording. In one embodiment, the Oculus SDK is used for avatar visualization and hand models. Additionally, the rendering function of the multi-media instruction authoring program 33 provides a video editor via which the user defines virtual cameras for rendering 2D video instructional content based on the digital twin recording, and can merge, split, and rearrange the timeline for the 2D video instructional content.

Methods for Authoring Multi-Media Instructional Content

A variety of methods, workflows, and processes are described below for enabling the operations and interactions of the AR system 20. In these descriptions, statements that a method, workflow, processor, and/or system is performing some task or function refers to a controller or processor (e.g., the processor 25) executing programmed instructions (e.g., the multi-media instruction authoring program 33, the AR/VR graphics engine 34) stored in non-transitory computer readable storage media (e.g., the memory 26) operatively connected to the controller or processor to manipulate data or to operate one or more components in the multi-media instruction authoring system 10 to perform the task or function. Additionally, the steps of the methods may be performed in any feasible chronological order, regardless of the order shown in the figures or the order in which the steps are described.

Additionally, various AR graphical user interfaces are described for operating the AR system 20. In many cases, the AR graphical user interfaces include graphical elements that are superimposed onto the user's view of the outside world or, in the case of a non-transparent display screen 28, superimposed on real-time images/video captured by the camera 29. In order to provide these AR graphical user interfaces, the processor 25 executes instructions of the AR graphics engine 34 to render these graphical elements and operates the display 28 to superimpose the graphical elements onto the user's view of the outside world or onto the real-time images/video of the outside world. In many cases, the graphical elements are rendered at a position that depends upon positional or orientation information received from any suitable combination of the sensors 30 and the camera 29, so as to simulate the presence of the graphical elements in real-world the environment. However, it will be appreciated by those of ordinary skill in the art that, in many cases, an equivalent non-AR graphical user interface can also be used to operate the multi-media instruction authoring program 33, such as a user interface provided on a further computing device such as laptop computer, tablet computer, desktop computer, or a smartphone.

Moreover, various user interactions with the AR graphical user interfaces and with interactive graphical elements thereof are described. In order to provide these user interactions, the processor 25 may render interactive graphical elements in the AR graphical user interface, receive user inputs from, for example via gestures performed in view of the one of the camera 29 or other sensor, and execute instructions of the multi-media instruction authoring program 33 to perform some operation in response to the user inputs.

Finally, various forms of motion tracking are described in which spatial positions and motions of the user or of other objects in the environment are tracked. In order to provide this tracking of spatial positions and motions, the processor 25 executes instructions of the multi-media instruction authoring program 33 to receive and process sensor data from any suitable combination of the sensors 30, the external sensors 24, and the camera 29, and may optionally utilize visual and/or visual-inertial odometry methods such as simultaneous localization and mapping (SLAM) techniques.

Figure 5:
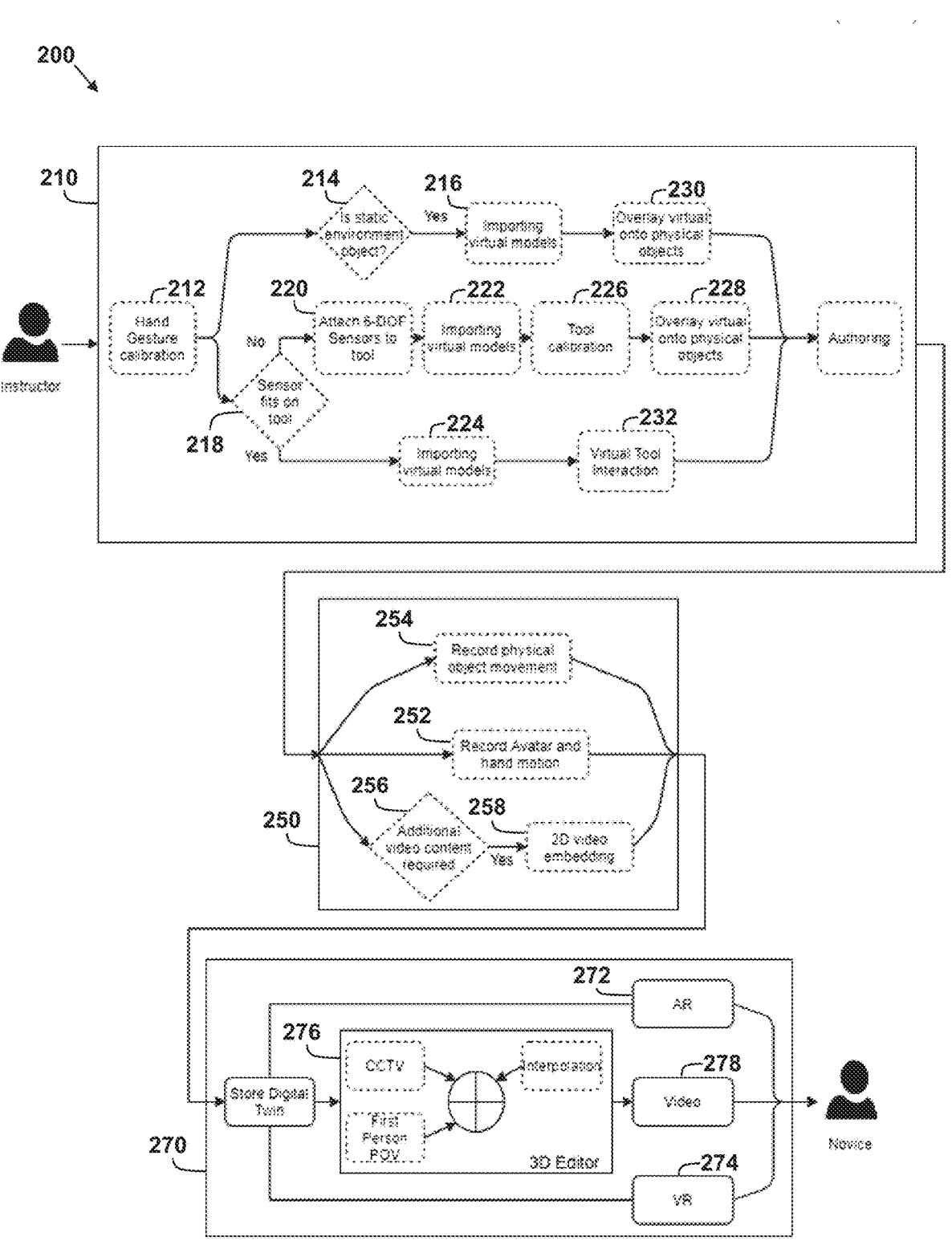
FIG. 5 shows a flow diagram that summarizes a method for authoring multi-media instructional content using the multi-media instruction authoring system.

FIG. 5 shows a flow diagram that summarizes a method 200 for generating multi-media instructional content using the multi-media instruction authoring system 10. Particularly, the method 200 advantageously enables the simultaneous creation of AR, VR, and 2D video based instructional media by subject matter experts. The method 200 advantageously requires only a single demonstration of the task by the subject matter expert and does not require any technical expertise of the subject matter expert. The method 200 advantageously incorporates an easy-to-use a 3D video editing interface for creating 2D videos from 3D recordings using simple free hand, in-headset interactions and leveraging novel virtual camera interactions.

The method begins with a setup phase in which the user sets up the environment for recording a digital twin recording (block 210). Particularly, in the setup phase, the user (e.g., a subject matter expert and/or instructor) defines custom hand gestures, imports virtual models for objects in the environment, attaches and calibrates sensors for dynamic objects (such as tools), and performs any other set up necessary prior to recording a digital twin recording.

Figure 6A:
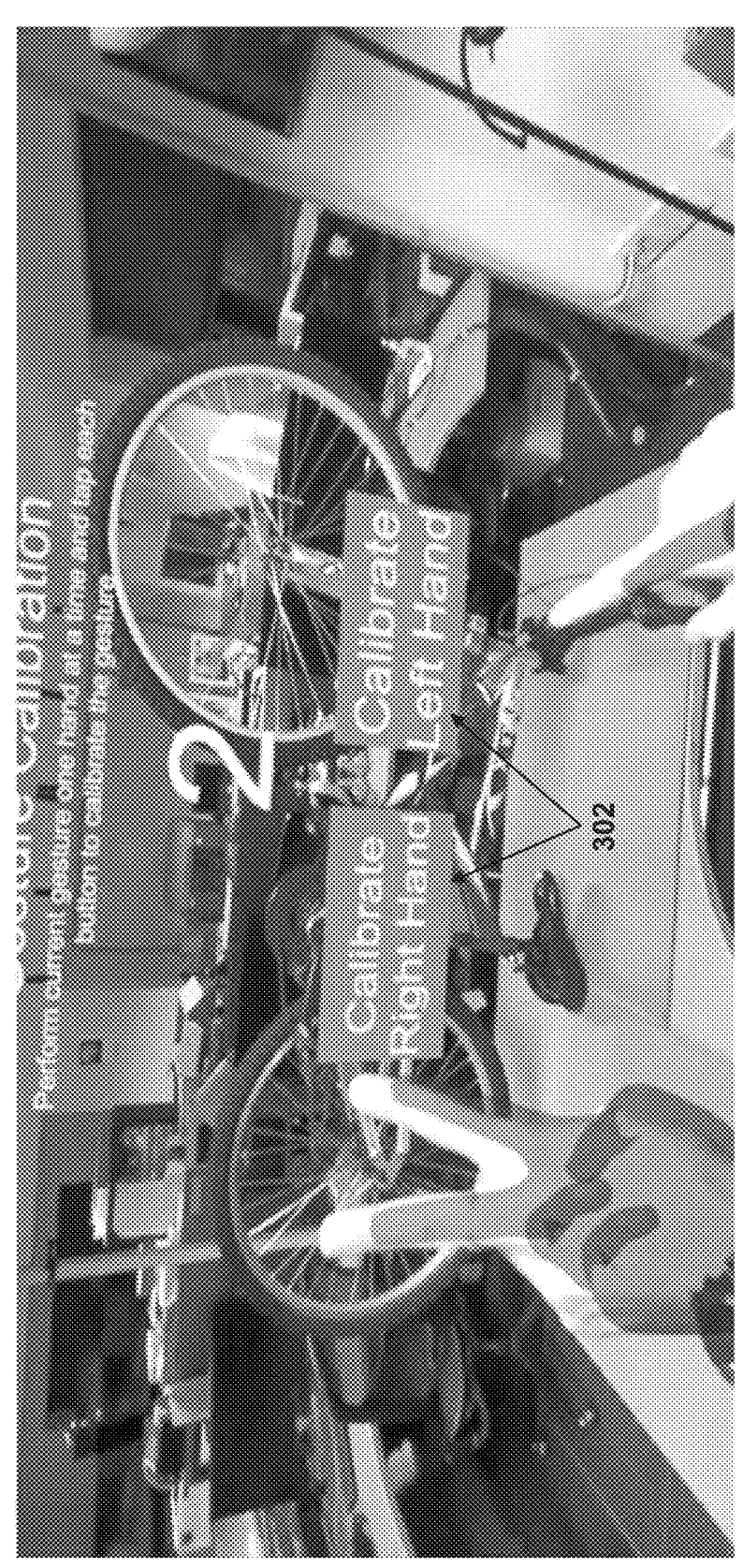
FIG. 6A shows an exemplary AR graphical user interface for recording a custom hand gesture.

Firstly, during the setup phase, the user can perform hand gesture calibration (block 212). Particularly, the method 200 provides users with the freedom to define their own custom hand gestures for different functions, interactions, and/or operations of the multi-media instruction authoring system 10 and its associated graphical user interfaces. To this end, while wearing the AR-HMD 23, the user performs a custom hand gesture in front of the camera 29 to define a custom hand gestures. FIG. 6A shows an exemplary AR graphical user interface 300 for recording a custom hand gesture. Particularly, to initiate the recording of a custom hand gesture, the user performs the desired hand gesture with one hand and, while performing the desired hand gesture, presses a corresponding 'Calibrate Gesture' button 302 in the AR graphical user interface 300 with their other hand to record the custom hand gesture. The camera 29 records images of the performance of the custom hand gesture, which are processed by the processor 25 (e.g., in response to the user pressing the 'Calibrate Gesture' button 302) to determine a corresponding hand pose or sequence of hand poses that characterize the custom hand gesture. FIG. 6B shows the hand pose information 310 that is recorded and tracked by the processor 25 for custom hand gesture creation and detection. In particular, the processor 25 determines the locations of a plurality of joints of one or two hand skeletons, each having wrist position node and several nodal hand joints positioned relative to the wrist position, or relative to other hand joints. In one embodiment, this hand tracking is performed using Oculus's hand tracking API.

Next, by interacting with the AR graphical user interfaces of the AR-HMD 23, the user pairs the custom hand gesture with a selected function, interaction, and/or operation of the multi-media instruction authoring system 10. Based on user inputs, the processor 25 pairs and/or associates the custom hand gesture with the user-selected function, interaction, and/or operation. At any time after the pairing, such as during the authoring of a digital twin recording, the processor 25 detects whenever the custom hand gesture is performed by the user. In response to detecting a performance of the custom hand gesture, the processor 25 automatically performs the user-selected function, interaction, and/or operation, or otherwise causes it to be performed.

FIG. 6C shows pseudocode for a custom hand gesture creation algorithm and a hand gesture detection algorithm. In summary, these gesture creation and detection algorithms of the multi-media instruction authoring system 10 utilize the relative vectors of the nodal hand joints with respect to the wrist position to recognize gestures. To recognize a custom hand gesture, the processor 25 compares the current relative nodal hand joint positions with the previously recorded relative hand joint positions. The processor 25 detects performance of the custom hand gesture if the current relative nodal hand joint positions are within a threshold similarity and/or distance of the previously recorded relative hand joint positions After creating custom hand gesture(s), the next step is to prepare the physical objects in the environment that are involved in the process, such as tools and workpieces. If a respective physical object is static within the environment (block 214), then the user selects a virtual model for import into the environment that corresponds to the respective physical object (block 216). However, if a respective physical object is a dynamic object that will be moved throughout the environment and if an external sensor 24 can be affixed to the respective physical object (block 218), then the user attaches an external sensor 24 (block 220) and then selects a virtual model for import into the environment that corresponds to the respective physical object (block 222). In at least some embodiments, the external sensor 24 attached to a respective physical object is a 6-DoF sensor, such as an Antilatency tracking module. Otherwise, if a respective physical object is a dynamic object that will be moved throughout the environment, but an external sensor 24 cannot be affixed to the respective physical object (e.g., a small screw), or if no real-world analog is available for the demonstration at all, then the user simply selects a virtual model for import into the environment that corresponds to the respective physical object (block 224). For the purpose of importing virtual models, the AR graphical user interface may provide menus from which the user can select virtual models from an existing virtual model library (e.g., CAD models or other 3D assets).

Figure 6D:
FIG. 6D shows an exemplary AR graphical user interface for performing tool calibration.

Next, for dynamic physical objects having an external sensor 24 attached, the user performs tool calibration (block 226) and overlays the virtual model onto the respective physical object (block 228). FIG. 6D shows an exemplary AR graphical user interface 310 for performing tool calibration. In the illustrated example, after attaching an external sensor 24 to a physical wrench 312, the user aligns the physical wrench 312 with a virtual wrench 314 that was previously imported using one hand. Once the physical wrench 312 is aligned with the virtual wrench 314, the user presses a 'Calibrate' button 316 with the other hand. Likewise, for static physical objects, the user overlays the virtual model onto the respective physical object (block 230) in a similar manner by virtually manipulating a position and orientation of the virtual model. For virtual models corresponding to dynamic physical object objects that are too small to incorporate an external sensor 24, the user can interact with or manipulate the virtual models virtually using hand gestures, or the like (block 232).

The method continues with an authoring phase in which the user records a digital twin recording as the user demonstrates a task (block 250). Particularly, in the authoring phase, the user records a digital twin recording, which will be later used to automatically generate multi-media instructional content. After the setup process, the user needs only to demonstrate the task in the physical realm and the multi-media instruction authoring system 10 records the digital twin recording. In other words, the user moves through the real-world environment and interacts with physical workpieces, tools, and other objects as they normally would to perform the task. Meanwhile, the multi-media instruction authoring system 10 records sequences of poses of the user and of the physical objects that are involved in the task, which are stored in the memory 26 as a digital twin recording.

Figure 7A:
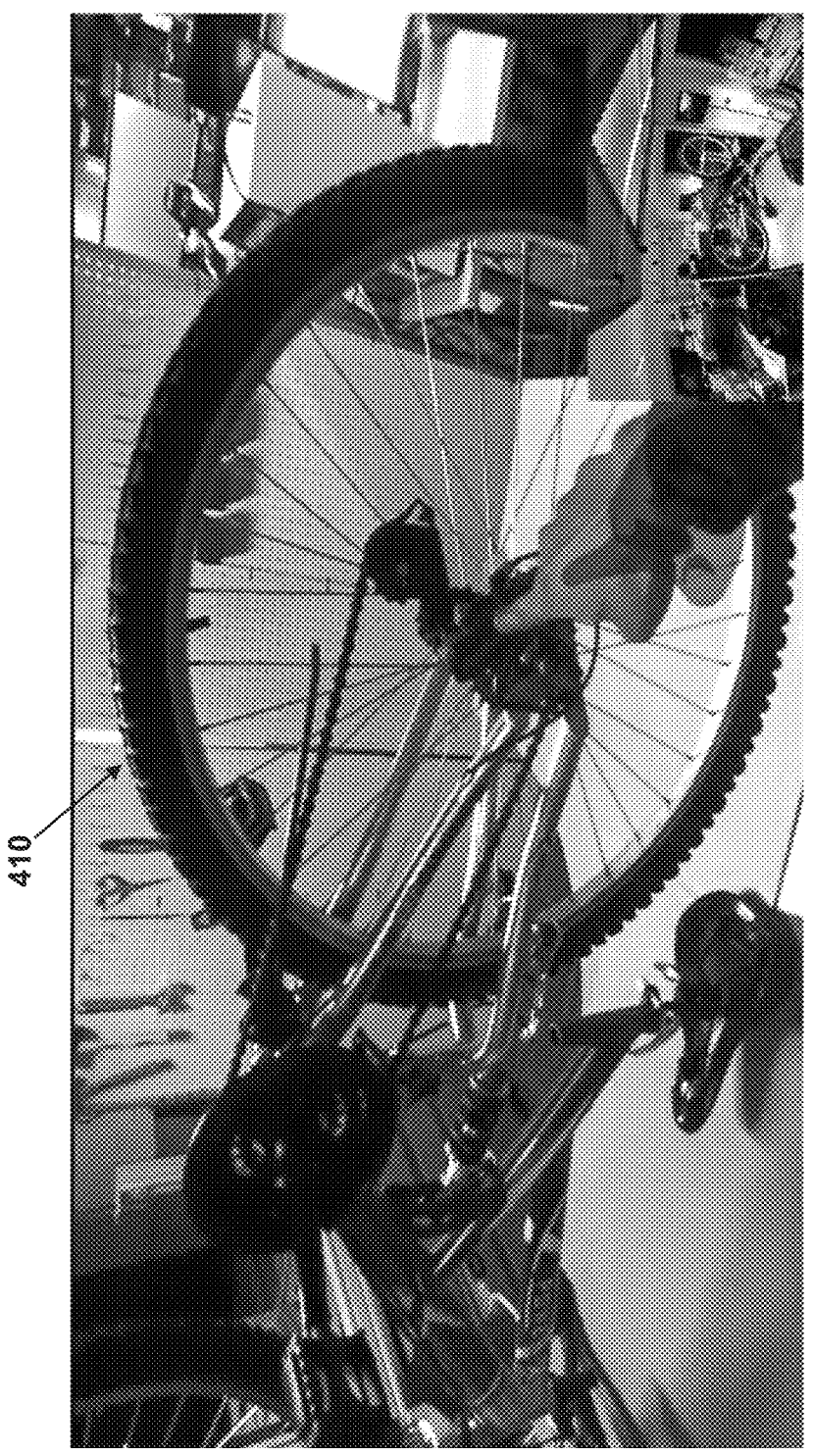
FIG. 7A shows a user recording an avatar interaction during a demonstration in which the user points to a location of interest on a bicycle.

Firstly, during the demonstration of the task for which instructional media is to be generated, virtual avatar and hand motions are recorded (block 252). Particularly, at least one sensor of the multi-media instruction authoring system 10 records sensor data of the demonstration of the task by the user in the real-world environment. Next, the processor 25 determines a first time sequence of pose data for a virtual avatar based on the sensor data of the recorded demonstration. Each frame of pose data is associated with a respective timestamp. In at least some embodiments, the first time sequence of pose data includes hand poses and torso poses for the virtual avatar, but may also include head pose data. In at least some embodiments, the processor 25 determines these hand, torso, and/or head poses of first time sequence of pose data for the virtual avatar based on sensor data received from sensors of the AR-HMD 23, e.g., images from the camera 29 and/or sensor data measured by any of the sensors 30 integrated with the AR-HMD 23. FIG. 7A shows a user recording an avatar interaction during a demonstration in which the user points to a location of interest on a bicycle 410.

Figure 7B:
FIG. 7B shows a user recording a tool interaction during a demonstration in which the user tightens a nut with a wrench.

Similarly, during the demonstration of the task, physical object movements are recorded (block 254). Particularly, in at least some cases, the demonstration of the task includes the user performing an operation using at least one real-world object (e.g., a tool or workpiece). The processor 25 determines at least one second time sequence of pose data for a at least one virtual object corresponding to the at least one real-world object based on the sensor data of the recorded demonstration. Each frame of pose data is associated with a respective timestamp. In at least some embodiments, the processor 25 determines the time sequence of pose data for each virtual object based on sensor data received from an external sensor 24 that was attached to each real-world object, e.g., 6-DoF sensor data measured by the external sensor 24. FIG. 7B shows a user recording a tool interaction during a demonstration in which the user tightens a nut on the bicycle 410 with a wrench 412.

In at least some embodiments, the processor 25 determines the sequences of poses in the form of a sequence of "tracking frames." Each tracking frame has a timestamp corresponding to the amount of time elapsed since the beginning of the recording and contains position and orientation information for the digital twin recording. The position and orientation information of each tracking frame includes an array of data that will be used for the virtual avatar of the user, including the position and orientation the user's head and/or the user's torso, the position and orientation for each wrist, and the position and orientation for each individual finger joint. In one embodiment, the processor 25 determines array of data for the virtual avatar using the Oculus SDK. Additionally, the position and orientation information of each tracking frame include the positions and orientations of all of the physical objects of interest, e.g., tools and workpieces involved in the task. In each case, the position and orientation information may take the form of 6-DoF values. In some embodiments, the processor 25 stores the tracking frames in a buffer on the memory 26 that is serialized, e.g., using Unity3D's serialization library.

In at least some embodiments, the recording function is automatically triggered once the user interacts with a particular physical object or with any physical object. Particularly, the processor 25 detects that the user interacts with a respective real-world object. In response to detecting that the user interacted with the real-world object, the processor 25 causes the recording of the digital twin recording to begin, as discussed above.

Finally, in some embodiments, if additional video content is required (block 256), then 2D video can be recorded for embedding into the instructional media (block 258). Particularly, during the recording phase, the user can record 2D videos for embedding into the instructional media. Particularly, for fine-grained interactions (e.g., inserting a screw into the corresponding screw hole), it may be preferable to use 2D video to convey instructions, since vision or sensor-based object tracking algorithms may fail when parts are occluded or have a small footprint. To address this technical issue, the multi-media instruction authoring system 10 advantageously allows authors to embed 2D video recordings as an alternative to 3D instructions. Through the self-determined custom hand gestures, the author begins and ends recording of the 2D video. The camera 29 records real-time 2D video of the demonstration and the processor 25 stores the video in the memory 26 in association with the digital twin recording. Once recorded, this 2D video will be included as a part of the VR or AR instructional content generated on the basis of the digital twin recording. Particularly, the 2D video can be embedded in 3D space based on the user's current position and orientation.

After the digital twin recording has been captured, the AR graphical user interface enables the user to replay the digital twin recording. In one embodiment, the processor 25 uses a de-serialization protocol to load a recording from the memory 26 to be replayed or scrubbed through. During replay, the timestamps stored in the tracking frames regulate the playback speed of the recordings, allowing the recording to be played back at the exact speed it was recorded, regardless of the framerate of the system.

Figure 8A:
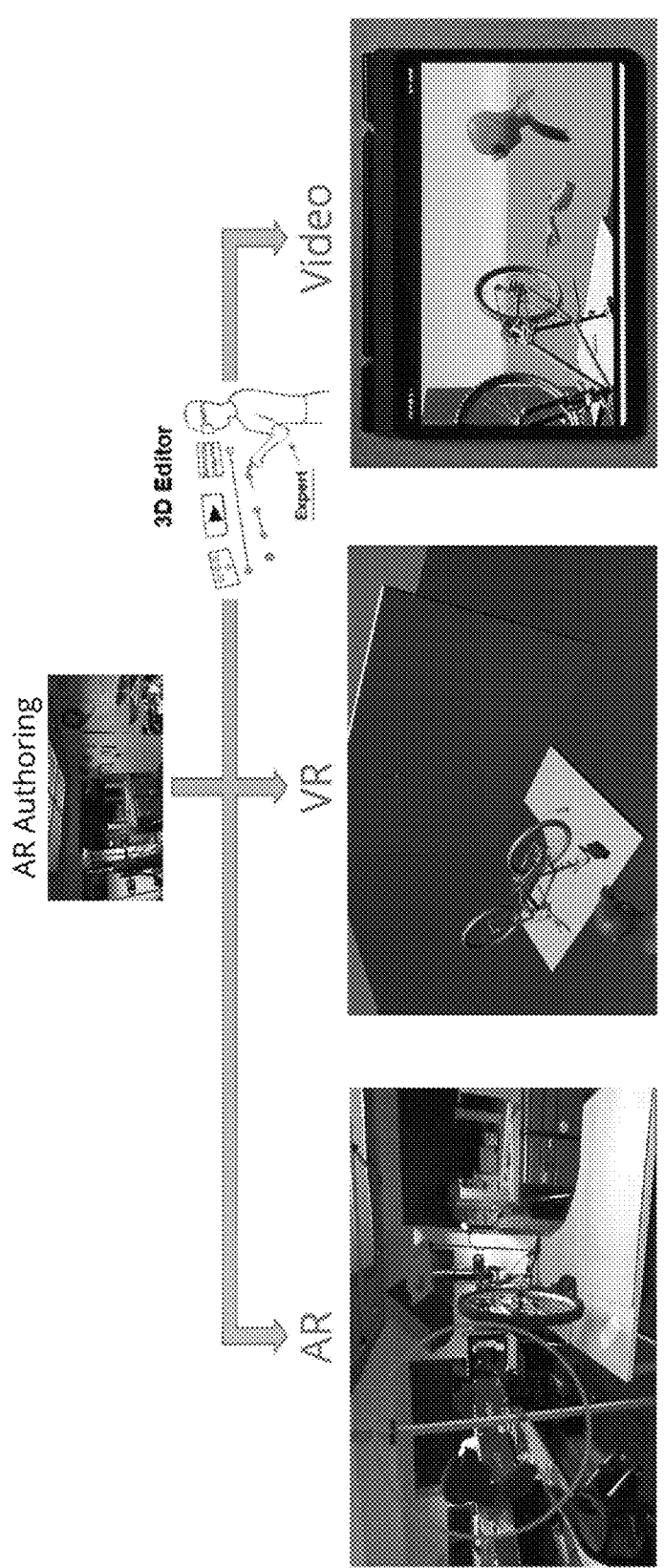
FIG. 8A shows multi-media outputs representing avatar interaction of FIG. 7A in which the instructor points to a location of interest.
Figure 8B:
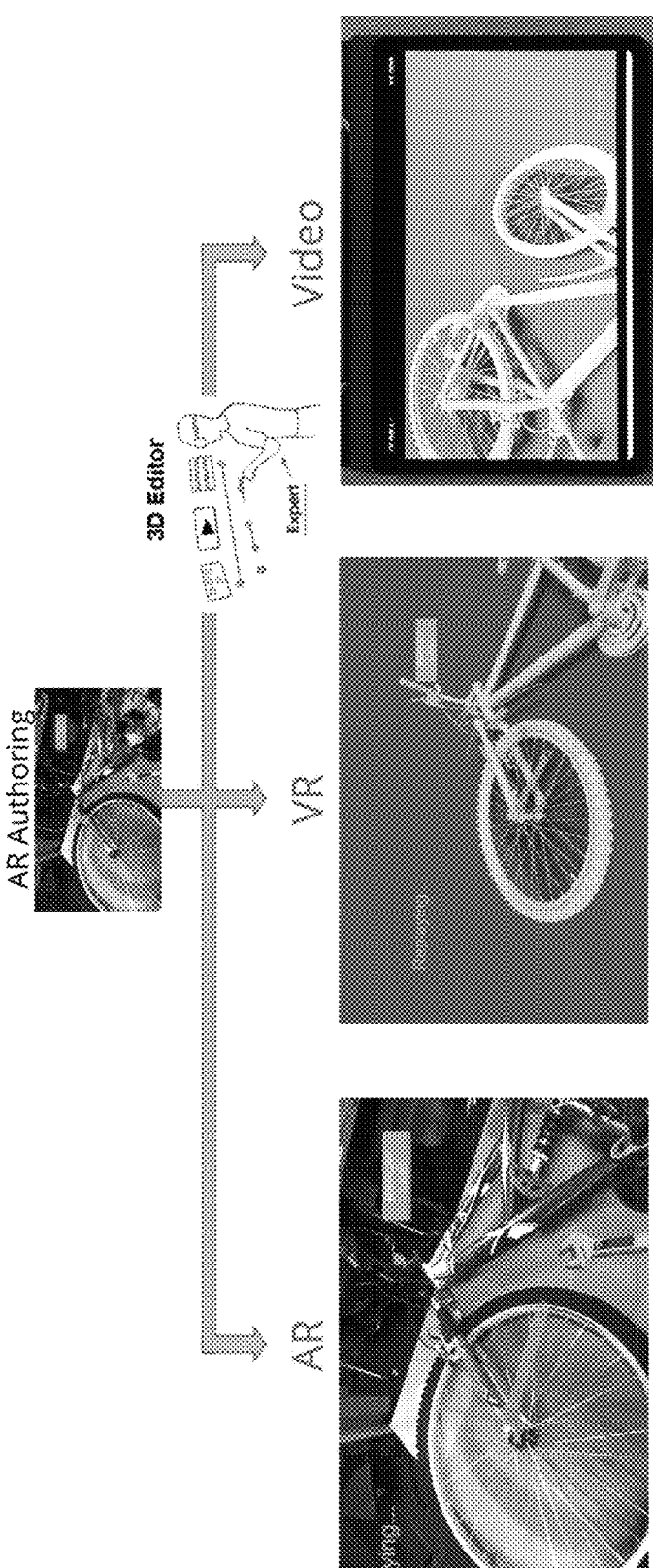
FIG. 8B shows multi-media outputs representing the tool interaction of FIG. 7B in which the instructor tightens a nut with a wrench.

The method concludes with an instructional media generation phase in which the AR, VR, and 2D video based instructional media are generated from the digital twin recording (block 270). Particularly, once the digital twin recording is recorded, the user can easily generate instructional media in AR, VR, and 2D video-based media formats. Based on the sequences of pose data of the digital twin recording, the processor 25 generates one or more one of (i) augmented reality content that, with aid of an augmented reality device, provides instructions to perform the task, (ii) virtual reality content that, with aid of a virtual reality device, provides instructions to perform the task, and (iii) a 2D video that provides instructions to perform the task. In advantageous embodiments, the processor 25 simultaneously generates two or more of the augmented reality content, the virtual reality content, and the 2D video. FIG. 8A shows multi-media outputs representing the virtual avatar interaction of FIG. 7A in which the instructor points to a location of interest on the bicycle 410. Similarly, FIG. 8B shows multi-media outputs representing the tool interaction of FIG. 7B in which the instructor tightens a nut with a wrench.

The processor 25 generates both the AR instructional content (block 272) and the VR instructional content (block 274) automatically from the digital twin recording using the associated virtual models of the physical objects involved in the task and the virtual avatar representing the user. In each case, these AR and VR instructional content comprise a plurality of virtual models and a plurality of time sequences of pose data from the digital twin recording. Each virtual model is associated with a respective time sequence of pose data from the digital twin recording. With respect to the AR instructional content, when used with an AR device (which may be essentially similar to the AR-HMD 23), a processor of the AR device operates a display of the AR device to display each respective virtual model superimposed on a real-world environment and animated to move according to the respective time sequence of pose data associated therewith. Similarly, with respect to the VR instructional content, when used with an VR device (which may be similar in many respects to the AR-HMD 23), a processor of the VR device operates a display of the VR device to display each respective virtual model within a virtual environment and animated to move according to the respective time sequence of pose data associated therewith.

In contrast to the AR and VR instructional content, the processor 25 generates the 2D instructional video by rendering a 2D rasterization of a virtual environment that includes a plurality of virtual models. These virtual models are the same as those used to generate the AR and VR instructional content and each respective virtual model is likewise associated with a respective time sequence of pose data from the digital twin recording, as discussed above. In the 2D instructional video, each virtual model is animated within the virtual environment to move according to the associated time sequence of pose data.

However, it should be appreciated that, in contrast to the AR and VR instructional content, a 2D instructional video provides only a predefined perspective of the virtual environment that is defined by the author (e.g., the subject matter expert or instructor) of the 2D instructional video and which is not later adjustable by end user (e.g., the novice learner). Thus, for the purpose of rasterization, the processor 25 must define a virtual camera pose for a virtual camera that views the plurality of virtual models within the virtual environment as they are animated in accordance with the digital twin recording. For these reasons, the creation of 2D instructional video from the digital twin recording requires the additional step of at least configuring the virtual camera and, optionally, editing a timeline of the 2D instructional video.

To this end, the multi-media instruction authoring system 10 provides the user with a 3D video editor (block 276) having a comprehensive immersive 3D AR or VR graphical user interface to configure, edit, and generate a the 2D instructional video (block 278) from the digital twin recording. In particular, the processor 25 operates the display screen 28 of the AR-HMD 23 (or of an equivalent VR device) to display a graphical user interface of the 2D video editor.

Figure 9:
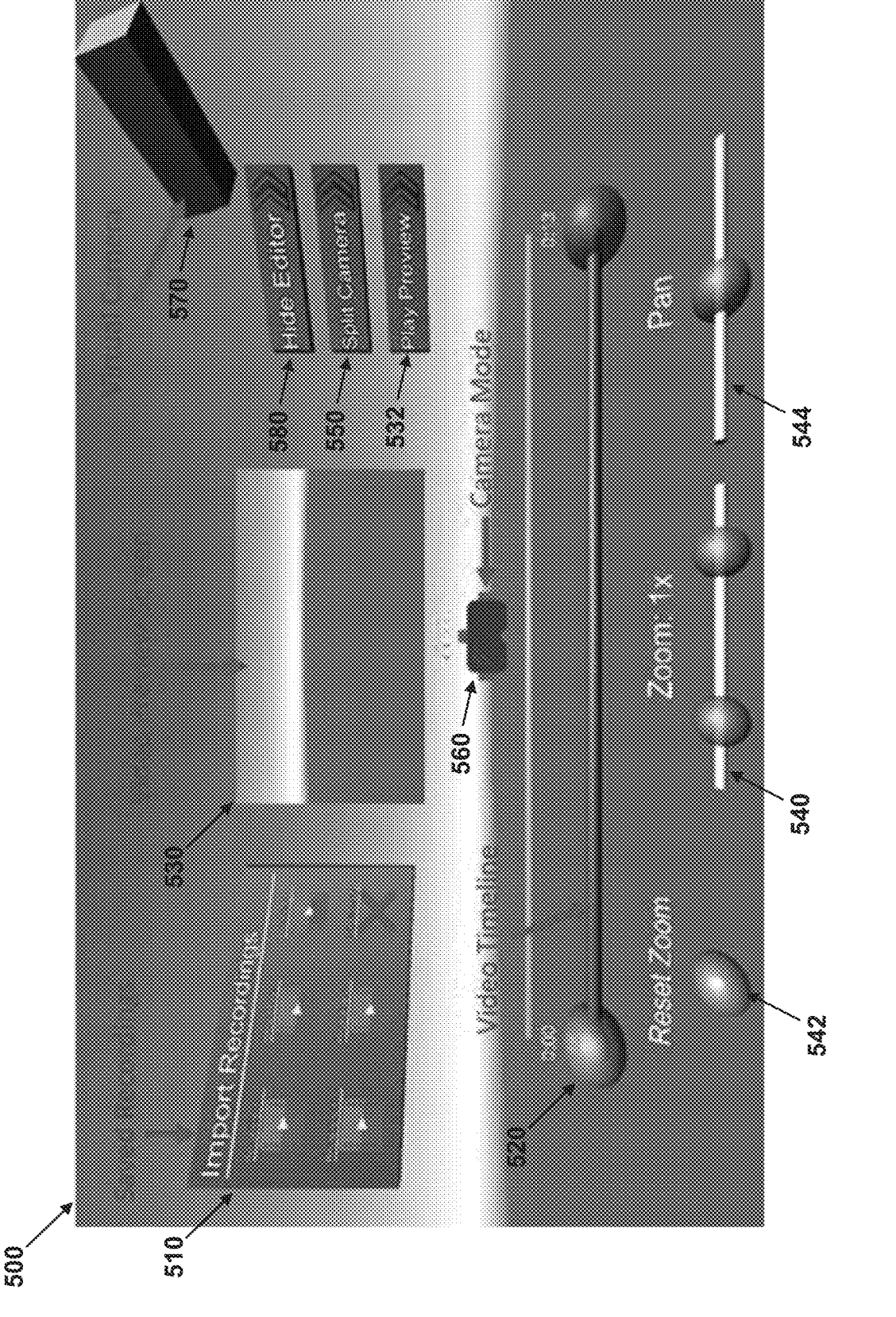
FIG. 9 shows an exemplary AR or VR graphical user interface of a 3D video editor for editing and generating 2D video renderings from the digital twin recording.

FIG. 9 shows an exemplary AR or VR graphical user interface 500 for editing and generating 2D video renderings from the digital twin recording (referred to herein as the '3D video editor'). The 3D video editor 500 includes several familiar features similar to a desktop-based video editors that have been adapted directly in the virtual environment, but also extends upon the features of a desktop-based video editor. The 3D video editor 500 enables loading recordings, scrubbing through the timeline, and previewing. Particularly, the user can select digital twin recordings from the import recordings menu 510. After selecting a digital twin recording, the user can scrub through the digital twin recordings using hand gestures and/or using the timeline slider 520. Additionally, the user can view an embedded preview 530 of the 2D instructional video within the 3D video editor 500 by selecting the 'Play Preview' button 532. Finally, the user can adjust a zoom level using the zoom slider 540 and zoom reset button 542, and adjust a panning using the pan slider 544.

In addition to these features, the 3D video editor 500 supports novel 3D interactions that are useful for creating 2D video content from a 3D recording. These include various virtual camera manipulations, as well hiding the user interface elements of the 3D video editor 500, walking around the scene, and showing a preview at different locations. Combined with the traditional 2D video editing features, these 3D video editing features enable immersivity in producing video content from pre-recorded 3D content.

A core element of the 3D video editor 500 is the virtual camera that allows for the 3D recordings to be captured as a 2D instructional video. Virtual cameras are common in VFX, movie making, and the gaming industry, but conventional interfaces are designed for expert users using a desktop-based interface. The 3D video editor 500 enables the user to define one or more virtual camera poses for the virtual camera to be used for generating 2D instructional video segments from the digital twin recording. With reference to FIG. 9, the user can select the 'Split Camera' button 550 to split a timeline for the 2D instructional video into multiple time segments, each having a different type of virtual camera pose and each associated with a different respective time segment of the digital twin recording. Within each time segment of the timeline, the user can define a camera pose for the time segment by pressing the camera mode button 560 and, in some cases, manually adjusting the virtual camera 570. Particularly, based on user inputs, the processor 25 defines or selects a virtual camera pose and/or virtual camera pose type of the virtual camera for each time segment of a timeline of the 2D instructional video that is being generated. Additionally, based on user inputs, the processor 25 defines or selects a corresponding time segment from the digital twin recording for each time segment of the timeline of the 2D instructional video. The processor 25 generates the 2D instructional video based on the timeline using the camera pose and time segment of the digital twin recording associated with each time segment of the timeline. Particularly, for each time segment of the timeline, the virtual models in the virtual environment are animated according to the associated time segment of the digital twin and the 2D instructional video is rasterized from the perspective of the virtual camera positioned according to the associated virtual camera pose.

Figure 10:
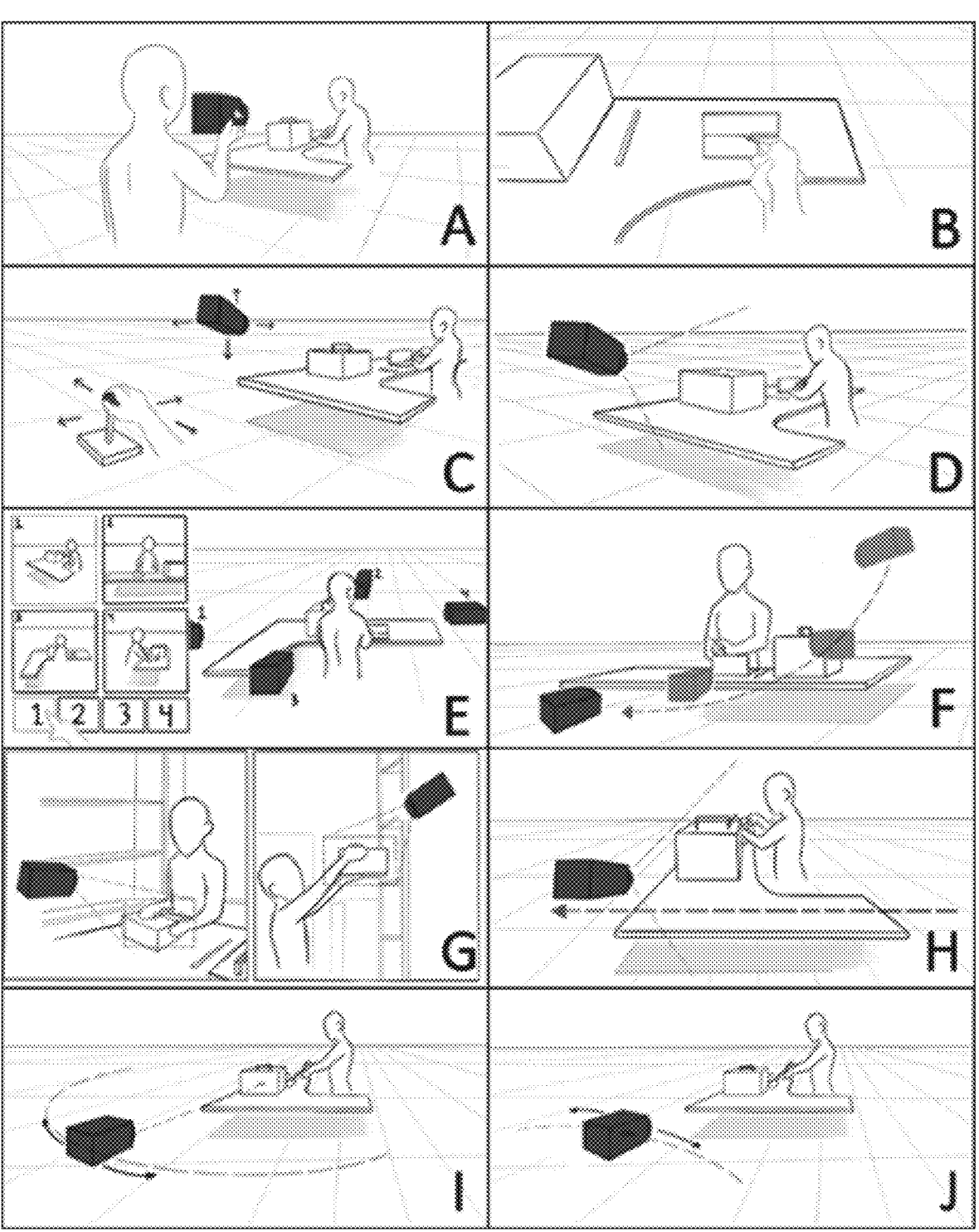
FIG. 10 shows several exemplary virtual camera types that can be used in the 3D video editor.

FIG. 10 shows several exemplary virtual camera types that can be used in the 3D video editor 500. The virtual camera types can be divided and categorized into two broad categories: static camera poses and dynamic camera poses. Static camera poses are those in which the virtual camera remains stationary. More particularly, for at time segment of the 2D instructional video having a static camera pose, the virtual camera has a static position and orientation within the virtual environment. Illustration (D) of FIG. 10 shows a third-person camera pose in which the virtual camera provides a single static third-person view of the virtual environment. Similarly, illustration (E) of FIG. 10 shows a CCTV camera pose in which the virtual camera provides multiple different static third-person views of the virtual environment. The camera pose allows the user to place four separate cameras in the scene at desired positions. The recording slice is then played back using a four-camera view (similar to a CCTV display) and the user can select which camera to "record" out of the four previews available (similar to television production for sports). This allows the end user to see several different points of view for the same task, allowing them to choose the best point of view at each point of time during the digital twin recording.

Dynamic camera poses move within the virtual space to capture the environment from different perspectives with respect to time. The dynamic camera poses they can be further classified into manual dynamic camera poses and automatic dynamic camera poses. Manual dynamic camera poses move through the environment in a manner that is manually defined by the user. More particularly, for at time segment of the 2D instructional video having a manual dynamic camera pose, the virtual camera has a position and orientation within the virtual environment that moves dynamically through the virtual environment over time according to a user-defined trajectory. Illustration (A) of FIG. 10 shows a manual camera pose in which the virtual camera moves according to a trajectory defined by the user manipulating the virtual camera 570 with his or her hands. Illustration (C) of FIG. 10 shows a manual tracking camera pose in which the virtual camera moves according to a trajectory defined by the user manipulating the virtual camera 570 with a joystick. Illustration (F) of FIG. 10 shows an interpolated third-person camera pose in which the virtual camera sweeps between two user-defined camera poses. The interpolated third-person camera allows the user to scrub the timeline and place a camera anywhere in the scene at any given time point. The processor 25 will then interpolate the camera position and rotation between the specified positions, creating a cinematic feel to the camera rendering. Illustration (H) of FIG. 10 shows a straight-line camera pose in which the virtual camera moves according to a straight-line trajectory defined by the user. Illustration (I) of FIG. 10 shows an arc line camera pose in which the virtual camera moves along an arc trajectory about a fixed focal point defined by the user and with a radius defined by the user. Finally, illustration (J) of FIG. 10 shows a moving focal point camera pose in which the virtual camera moves about a point as the focal point moves along a line defined by the user.

In contrast to manual dynamic camera poses, automatic dynamic camera poses move through the environment in an automatic manner that depends on a state of the virtual environment. More particularly, for at time segment of the 2D instructional video having an automatic dynamic camera pose, the virtual camera has a position and orientation within the virtual environment that moves according to a trajectory that depends on a current state of at least one virtual model. Illustration (B) shows a first-person camera that automatically aligns the virtual camera with the head of the virtual avatar, thereby providing a first-person view of the task as it was demonstrated by the instructor. Illustration (G) shows an automated hand tracking camera that moves the virtual camera in a manner so as to keep the virtual hands of the virtual avatar within the frame at all times. FIG. 11 shows an algorithm used, in one embodiment, by the processor 25 to determine the virtual camera pose for each frame when an automated hand tracking camera is used.

Returning to FIG. 9, throughout the entire editing process, the user can walk around the virtual environment. Particularly, within the 3D video editor 500, the processor 25 renders the plurality of virtual models and animates them to move according to digital twin recording. In other words, a replay of the digital twin recording is provided within the virtual environment and the graphical user interface elements of the 3D video editor 500 discussed herein are each superimposed upon the replay of the digital twin recording. The user can walk around to view the digital twin recording from different perspectives. The user can press a 'Hide Editor' button 580 within the 3D video editor 500 to hide the graphical user interface elements of the 3D video editor 500, to provide a better view of the digital twin recording. The 3D video editor 500 enables the user to scrub through each digital twin recording timeline using hand gestures, the timeline slider 520, or the like. Particularly, based on user inputs, the processor 25 selects a point in time in the digital twin recording and displays, within the 3D video editor 500, a state of the plurality of virtual models at the selected point in time in the digital twin recording.

Finally, as noted above, throughout the entire editing process, the user can also preview the 2D instructional video within the embedded preview 530 of the 3D video editor 500 rendering can be seen in a small display in the middle of the editor, much like a traditional video editor. As the user scrubs through the timeline using hand gestures and/or using the timeline slider 520, both the 2D instructional video and the plurality of virtual models of the 3D scene will update. In this way, the user can see where the virtual camera is located with the 3D virtual environment at each point within the 2D instructional video. Lastly, once the user completes the video editing process, they can export and save the video in a standard video format, which can be played on any device that supports video playback.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for generating multi-media instructional content, the method comprising:
   recording, with at least one sensor, a demonstration by a user of a task within a real-world environment;
   determining, with a processor, a first sequence of pose data for a virtual avatar based on the recorded demonstration;
   generating, with the processor, based on the first sequence of pose data, at least one of augmented reality content and virtual reality content that provides instructions to perform the task, the at least one of the augmented reality content and the virtual reality content including a virtual model of the virtual avatar associated with the first sequence of pose data; and
   generating, with the processor, based on the first sequence of pose data, a two-dimensional video that provides instructions to perform the task, the two-dimensional video being generated using a virtual camera that views the virtual model of the virtual avatar within a virtual environment and by animating the virtual model of the virtual avatar to move according to the first sequence of pose data.

2. The method according to claim 1, the generating the at least one of the augmented reality content and the virtual reality content comprising:
   generating both of the augmented reality content and the virtual reality content.

3. The method according to claim 1, wherein the at least one sensor includes a sensor of a head-mounted augmented reality device, recorded sensor data from which is used to determine the first sequence of pose data.

4. The method according to claim 1, wherein the first sequence of pose data includes hand poses for the virtual avatar.

5. The method according to claim 1 further comprising:
   determining, with the processor, a second sequence of pose data for a virtual object based on the recorded demonstration, the demonstration including the user performing an operation using a real-world object corresponding to the virtual object.

6. The method according to claim 5, wherein the at least one sensor includes a sensor attached directly to the real-world object, recorded sensor data from which is used to determine the second sequence of pose data.

7. The method according to claim 5 further comprising:
   detecting that the user interacts with the real-world object, wherein the recording the demonstration automatically begins in response to detecting that the user has interacted with the real-world object.

8. The method according to claim 1 further comprising:
recording, with a camera, during the demonstration, a two-dimensional video of the demonstration,
wherein at least one of (i) the augmented reality content and (ii) the virtual reality content includes the two-dimensional video embedded therein.

9. The method according to claim 1 further comprising:
recording, with a camera, a hand gesture performed by the user;
pairing, with the processor, based on user inputs, the hand gesture with a user-selected operation;
detecting, with the processor, after the pairing, performance of the hand gesture; and
performing, with the processor, the user-selected operation in response to detecting the performance of the hand gesture.

10. The method according to claim 1, wherein the augmented reality content includes a plurality of virtual models and a plurality of time sequences of pose data, the plurality of virtual models including the virtual model of the virtual avatar, each respective virtual model of the plurality of virtual models being associated with a respective sequence of pose data of the plurality of time sequences of pose data, the plurality of time sequences of pose data including the first sequence of pose data, the method further comprising:
displaying, on a display of an augmented reality device, each respective virtual model of the plurality of virtual models superimposed on the real-world environment and animated to move according to the respective sequence of pose data of the plurality of time sequences of pose data.

11. The method according to claim 1, wherein the virtual reality content includes a plurality of virtual models and a plurality of time sequences of pose data, the plurality of virtual models including the virtual model of the virtual avatar, each respective virtual model of the plurality of virtual models being associated with a respective sequence of pose data of the plurality of time sequences of pose data, the plurality of time sequences of pose data including the first sequence of pose data, the method further comprising:
displaying, on a display of a virtual reality device, each respective virtual model of the plurality of virtual models within a virtual environment and animated to move according to the respective sequence of pose data of the plurality of time sequences of pose data.

12. The method according to claim 1, the generating the two-dimensional video further comprising:
generating, with the processor, the two-dimensional video using the virtual camera, which views a plurality of virtual models within the virtual environment, the plurality of virtual models including the virtual model of the virtual avatar,
wherein, in the two-dimensional video, each respective virtual model of the plurality of virtual models is animated to move according to a respective time sequence of pose data of a plurality of time sequences of pose data, the plurality of time sequences of pose data including the first sequence of pose data.

13. The method according to claim 12, the generating the two-dimensional video further comprising:
displaying, on a display of at least one of an augmented reality device and a virtual reality device, a graphical user interface;
defining, based on user inputs, at least one pose of the virtual camera; and generating, with the processor, the two-dimensional video using the virtual camera having the defined camera pose.

14. The method according to claim 13, the generating the two-dimensional video further comprising:
defining, based on user inputs, a timeline of the two-dimensional video including a first time segment of the two-dimensional video and a second time segment of the two-dimensional video;
defining, based on user inputs, for the first time segment of the timeline, a first pose of the virtual camera and a first time segment of the plurality of time sequences of pose data;
defining, based on user inputs, for the second time segment of the timeline, a second pose of the virtual camera and a second time segment of the plurality of time sequences of pose data; and
generating (i) the first time segment of the two-dimensional video using the virtual camera having the first camera pose and with the plurality of virtual models animated to move according to the first time segment of the plurality of time sequences of pose data and (ii) the second time segment of the two-dimensional video using the virtual camera having the second camera pose and with the plurality of virtual models animated to move according to the second time segment of the plurality of time sequences of pose data.

15. The method according to claim 13, wherein, for a first time segment of the two-dimensional video, the virtual camera has a first camera pose in which the virtual camera has a static position and orientation within the virtual environment.

16. The method according to claim 13, wherein, for a second time segment of the two-dimensional video, the virtual camera has a second camera pose in which the virtual camera moves dynamically through the virtual environment over time according to a user-defined trajectory.

17. The method according to claim 13, wherein, for a third time segment of the two-dimensional video, the virtual camera has a third camera pose in which the virtual camera moves dynamically through the virtual environment over time according to a trajectory that depends on a current state of at least one virtual model of the plurality of virtual models.

18. The method according to claim 13 further comprising:
displaying, within the graphical user interface on the display, a preview of the two-dimensional video.

19. The method according to claim 13 further comprising:
displaying, within the graphical user interface on the display, the plurality of virtual models within the virtual environment, each respective virtual model of the plurality of virtual models being animated to move according to a respective time sequence of pose data of the plurality of time sequences of pose data.

20. The method according to claim 19, the displaying the plurality of virtual models within the virtual environment further comprising:
selecting, based on user inputs, a selected point in time of the plurality of time sequences of pose data; and
displaying, within the graphical user interface on the display, a state of the plurality of virtual models at the selected point in time.

* * * * *